United States Patent
Jung et al.

(10) Patent No.: US 7,333,286 B2
(45) Date of Patent: Feb. 19, 2008

(54) METHOD OF WRITING A REFERENCE SERVO SIGNAL OF HARD DISK DRIVE AND APPARATUS SUITABLE THEREFOR

(75) Inventors: Kwang-jo Jung, Suwon-si (KR); Da-woon Chung, Suwon-si (KR); Byoung-kul Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/528,547

(22) Filed: Sep. 28, 2006

(65) Prior Publication Data
US 2007/0081268 A1 Apr. 12, 2007

(30) Foreign Application Priority Data
Oct. 11, 2005 (KR) ...................... 10-2005-0095495

(51) Int. Cl.
*G11B 21/02* (2006.01)
(52) U.S. Cl. ...................................................... 360/75
(58) Field of Classification Search ................. 360/75, 360/78.09, 51, 77.04, 73.01, 78.14, 69
See application file for complete search history.

(56) References Cited

U.S. PATENT DOCUMENTS

| | | | |
|---|---|---|---|
| 5,583,712 A | 12/1996 | Brunelle | |
| 5,668,679 A | 9/1997 | Swearingen et al. | |
| 6,304,407 B1 | 10/2001 | Baker et al. | |
| 6,476,989 B1 | 11/2002 | Chainer et al. | |
| 6,479,954 B1 | 11/2002 | Peritore et al. | |
| 6,507,450 B1 | 1/2003 | Elliott | |
| 6,704,156 B1 | 3/2004 | Baker et al. | |
| 6,943,978 B1 * | 9/2005 | Lee | 360/75 |
| 6,965,489 B1 * | 11/2005 | Lee et al. | 360/75 |
| 6,967,799 B1 * | 11/2005 | Lee | 360/51 |
| 6,987,636 B1 * | 1/2006 | Chue et al. | 360/75 |
| 6,989,954 B1 * | 1/2006 | Lee et al. | 360/75 |
| 6,992,848 B1 * | 1/2006 | Agarwal et al. | 360/75 |

(Continued)

FOREIGN PATENT DOCUMENTS

EP  1207618  5/2002

(Continued)

OTHER PUBLICATIONS

European Search Report dated Jul. 25, 2007 issued in EP 06122112.

*Primary Examiner*—Fred F. Tzeng
(74) *Attorney, Agent, or Firm*—Stanzione & Kim, LLP

(57) ABSTRACT

In a method of writing a reference servo signal of a hard disk drive having a spiral reference servo signal that is referred to when writing a final servo signal is written while a head is moved across a disk for a predetermined time at a target movement velocity, an actual movement velocity of the head is detected from a counter electromotive force generated in a voice coil motor that moves that head, for the predetermined time during which the spiral reference servo signal is written, and the head is controlled to maintain the target movement velocity by feeding back the detected actual movement velocity.

21 Claims, 8 Drawing Sheets

U.S. PATENT DOCUMENTS

| | | | |
|---|---|---|---|
| 6,992,851 B1 * | 1/2006 | Cloke | 360/75 |
| 6,992,852 B1 * | 1/2006 | Ying et al. | 360/75 |
| 7,016,134 B1 * | 3/2006 | Agarwal et al. | 360/51 |
| 7,068,459 B1 * | 6/2006 | Cloke et al. | 360/75 |
| 7,088,533 B1 * | 8/2006 | Shepherd et al. | 360/51 |
| 7,113,362 B1 * | 9/2006 | Lee et al. | 360/77.04 |
| 7,145,744 B1 * | 12/2006 | Clawson et al. | 360/75 |
| 7,212,364 B1 * | 5/2007 | Lee | 360/51 |
| 7,248,426 B1 * | 7/2007 | Weerasooriya et al. | 360/51 |
| 2003/0214747 A1 | 11/2003 | Baral | |
| 2006/0176607 A1 * | 8/2006 | Stoev et al. | 360/78.09 |

FOREIGN PATENT DOCUMENTS

| | | |
|---|---|---|
| JP | 1987-8922 | 6/1987 |
| JP | 8-255448 | 10/1996 |
| JP | 2000-34856 | 6/2000 |
| JP | 2002-288956 | 10/2002 |
| JP | 2004-185682 | 7/2004 |
| JP | 2005-25826 | 1/2005 |

* cited by examiner

METHOD OF WRITING A REFERENCE SERVO SIGNAL OF HARD DISK DRIVE AND APPARATUS SUITABLE THEREFOR

CROSS-REFERENCE TO RELATED APPLICATIONS

This application claims the benefit of Korean Patent Application No. 10-2005-0095495, filed on Oct. 11, 2005, in the Korean Intellectual Property Office, the disclosure of which is incorporated herein in its entirety by reference.

BACKGROUND OF THE INVENTION

1. Field of the Invention

The present general inventive concept relates to a method of writing a reference servo signal of a hard disk drive, and more particularly, to a method of writing a reference servo signal of a hard disk drive by which the hard disk drive by itself can write the spiral reference servo signal, and an apparatus suitable therefor.

2. Description of the Related Art

In general, a hard disk drive that is a data storage media reproduces data recorded on a disk or writes data to a disk using a magnetic head. As the hard disk drive gradually increases in capacity and density, while being made compact, BPI (bit per inch), which is a density of data in a rotational direction of the disk, and TPI (track per inch), which is the density of data in a radial direction of the disk also increase. As a result, a more accurate control mechanism is needed for the hard disk drive.

The hard disk drive includes an HDA (head disk assembly) and a PCB (printed circuit board) assembly to control the HDA. The HDA includes a head for storing or restoring information, a disk on which the information is recorded, a spindle motor for rotating the disk, an actuator arm and a VCM (voice coil motor) for moving the head, and an ODCS (outer disk crash stop) and IDCS (inner disk crash stop) for restricting a range of movement of the actuator arm. The ODCS and IDCS are bumping units which restrict the range of movement of the actuator arm to prevent the head from moving to a position where servo information of the disk is not recorded.

In order to control the position of the head on the disk, the servo information (i.e., position information) is recorded for each track. As the recording density of the hard disk drive increases, a total number of tracks increases so that a portion taken by the time needed for recording the servo information on the disk of an entire process time is gradually increased.

A conventional servo writing method to record the servo information on a disk in a hard disk drive uses a servo writer having a high precision encoder and a mechanical pushpin. One end of the mechanical pushpin is attached to a master actuator arm and the other end is extended through a slot to the servo writer outside of the hard disk drive. The movement of the mechanical pushpin, that is, the movement of the master actuator arm, is controlled by the high precision encoder and a positioner. In addition, a clock head (not shown) is instructed to record clock information on the disk to provide position information in the rotational direction of the disk. The servo writer controls the position of the head in the radial direction of the disk by the mechanical pushpin and writes a reference servo signal of the disk.

The above described conventional servo writing method has a problem in that the precision of the positional control is deteriorated by non-repeatable run out (NRRO), disk flutter, and vibration of a spindle motor. Furthermore, the use of the servo writer with the positioner/encoder greatly increases costs related to the servo writing method so that an efficiency of production of the hard disk drive is negatively affected.

Servo writing methods developed in an attempt to solve the problem described above include an off-line servo writing method and a self servo writing method. According to the off-line servo writing method, servo information is written on disks in advance using an off-line servo track writing apparatus before the disks are installed in the hard disk drive. This off-line servo writing method can improve precision compared to the conventional servo writing method (described above). However, the off-line servo writing method has problems of an increase of repeatable run out (RRO) generated by an eccentricity of the disk and an increase of an additional track search generated due to a shift between the disks.

On the other hand, according to the self servo writing method, reference servo information is first written on one of assembled disks (i.e., a reference disk) using a servo writer and then final servo information is written on the disks by the hard disk drive itself by referring to the reference servo information written on the reference disk. In this method, a quality of the final servo information is determined according to a precision of the reference servo information. Also, the self servo writing method does not rely on the conventional servo writer (described above), thereby decreasing cost. However, in the self servo writing method, the time for self servo writing increases and a tracing capability based on the reference servo information is weak.

The writing of the reference servo information for the self servo writing method includes a burst method and a spiral method. According to the burst method, a reference servo signal is written radially to the disk and a final servo signal is written by referring to the reference servo signal. According to the spiral method, reference servo signals having a spiral shape are written to the disk and the final servo signal is written by referring to the spiral reference servo signals.

U.S. Pat. No. 5,668,679 published on Sep. 16, 1997, Korean Utility Model Publication No. 87-8922 published on Jun. 13, 1987, and Korean Patent Publication No. 2000-34856 published on Jun. 26, 2000 describe the spiral method in detail.

In writing the reference servo signal, the spiral method is typically faster than any other burst method. However, since the conventional self servo writing methods all use the conventional servo writer (described above) to write the reference servo signal, the cost for manufacturing the hard disk drive is high.

FIG. 1 schematically illustrates a conventional method for recording a spiral reference servo signal 100, which is described in U.S. Pat. No. 5,668,679. Referring to FIG. 1, a spiral reference servo signal writing apparatus includes a disk 12 installed on a spindle motor (not shown) that is rotatable, an actuator arm 24 that can adjust a position of a read/write head 16 attached thereto, two crash stops 17 and 18, and a voice coil 26. When the voice coil 26 is excited and thus the actuator arm 24 moves with respect to the disk 12, the head 16 is located at an arbitrary position between R1 and R2 on the disk 12. R1 and R2 respectively indicate an outer circumferential limit and an inner circumferential limit of the spiral reference servo signal 100. When the signal is written to the disk 12 while moving the head 16 in a radial direction of the disk 12 at a constant velocity between R1 and R2, the spiral reference servo signal 100 is spirally written as illustrated in FIG. 1. Here, T0 represents an index, T1 represents a time offset that the spiral track 100 passes the track position R1 under the head 16, and T2 represents a different time offset that the spiral track 100 passes the track position R1 under the head 16 at a different time than the offset T1.

FIG. 2 illustrates a pattern of writing the spiral reference servo signal 100 to the disk 12. The spiral reference servo signal 100 is written at least as many as a number of sectors in a circumferential direction of the disk 12 (actually two times). Although not illustrated in FIG. 2, the spiral reference servo signal is written while being wound about 20 times between R1 and R2.

R1 and R2 of FIG. 1 indicate the outer circumferential limit and the inner circumferential limit where the spiral reference servo signal 100 can be written, which are respectively referred to as a reference writing start position and a reference writing stop position.

A clock signal (not shown) is provided to indicate an interval of writing the spiral reference servo signal 100, that is, the position on the circumference of the disk 12. The clock signal is written to an outermost circumference of the disk 12 by a clock head (not shown) of the conventional servo writer. The clock head of the conventional servo writer is pulled back into the hard disk drive through another slot.

FIG. 3 illustrates a detailed structure of the spiral reference servo signal 100 written to a disk. The spiral reference servo signal 100 has burst 302 and sync bits 304.

A step of writing a final servo signal by referring to the spiral reference servo signal 100 is referred to as a servo copy step. In the servo copy step, referring to the sync bits 304 illustrated in FIG. 3, the final servo signals are written based on concentric tracks formed by linking the sync bits 304 at the same positions in the radial direction of the disk 12.

In writing the spiral reference servo signal 100 using the apparatus of FIG. 1, the actuator arm 24 is driven by a mechanical pushpin (not shown) and the mechanical pushpin is driven by the conventional servo writer outside the hard disk drive. The conventional servo writer includes an encoder and a position setter to drive the mechanical pushpin. In the burst method, the reference servo signal is written using the conventional servo writer. That is, in the conventional reference servo signal writing method, an external servo writer is needed which extends inwardly into the hard disk drive to precisely control the position of the mechanical pushpin connected to the actuator arm 24. Thus, a high precision encoder and a position setter are required.

In the hard disk drive, since the positions of a slot in which the pushpin of the servo writer is inserted and a slot in which the clock head is inserted are different according to the model type, the conventional servo writer needs to be separately provided (i.e., manufactured) for each model. In the self servo writing method, this necessity of the conventional servo writer increases the manufacturing cost of the hard disk drive.

SUMMARY OF THE INVENTION

The present general inventive concept provides a method of writing a spiral reference servo signal using a hard disk drive itself to improve productivity, in writing the spiral reference servo signal suitable for self servo writing to a disk of a hard disk drive.

The present general inventive concept also provides an apparatus to write a spiral reference servo signal and a hard disk drive including the same.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a method of writing a reference servo signal of a hard disk drive, the method including writing a spiral reference servo signal that is referred to when writing a final servo signal is written, while a head is moved across a disk for a predetermined time at a target movement velocity, detecting an actual movement velocity of the head is detected from a counter electromotive force generated in a voice coil motor that moves that head, for a predetermined time during which the spiral reference servo signal is written, and the head is controlled to maintain the target movement velocity by feeding back the detected actual movement velocity.

The foregoing and/or other aspects of the present general inventive concept may also be achieved by providing a method of writing a reference servo signal in which a spiral reference servo signal that is referred to when writing a final servo signal of a hard disk drive is written, which is achieved by comprising accelerating a head at a target movement velocity from a start position to a reference servo writing start position by driving a voice coil motor, detecting an actual movement velocity of the head by a counter electromotive force of the voice coil motor for a predetermined time during which the spiral reference servo signal is written from the reference servo writing start position and moving the head at the target movement velocity by feeding back the detected actual movement velocity; and decelerating and moving the head to a stop position after the predetermined time elapses.

The start position and the stop position may be restricted by crash stops which limit movement of an actuator arm of the hard disk drive.

The foregoing and/or other aspects of the present general inventive concept may also be achieved by providing a method of writing a reference servo signal on a disk to write a final servo signal of a hard disk drive using the disk having a track where the servo signal to indicate a reference writing start position is written, the method including tracing the track by moving a head from a start position, detecting an actual movement velocity of the head from a counter electromotive force of a voice coil motor for a predetermined time during which a spiral reference servo signal is written in a radial direction of the disk from the track, and moving the head at a target movement velocity by feeding back the detected actual movement velocity, decelerating and moving the head to a stop position after the predetermined time elapses, and returning the head from the stop position to the start position.

The foregoing and/or other aspects of the present general inventive concept may also be achieved by providing a method for writing a reference servo signal to write a final servo signal of a hard disk drive using a disk having a first track where a first servo signal to indicate a reference writing start position is written and a second track where a second servo signal to indicate a reference writing stop position is written, the method including tracing the first track by moving a head from a start position, detecting an actual movement velocity of the head from a counter electromotive force of a voice coil motor for a time period during which a spiral reference servo signal is written from the first track to the second track, and moving the head at a target movement velocity by feeding back the detected actual movement velocity, decelerating and moving the head to a stop position when the second track is detected, and returning the head from the stop position to the start position.

The foregoing and/or other aspects of the present general inventive concept may also be achieved by providing a hard disk drive having a spiral reference servo signal written thereon that is referred to when writing a final servo signal while a head is moved for a predetermined time at a constant velocity in a radial direction of a disk. The hard disk drive includes a voice coil motor to move the head, a counter electromotive force measuring portion to measure a counter electromotive force of the voice coil motor, and a velocity control portion to control drive current that is applied to the voice coil motor. The velocity control portion detects an actual movement velocity of the head from the counter electromotive force measured by the counter electromotive measuring portion for the predetermined time during which the spiral reference servo signal is written, compares the detected actual movement velocity with a target movement velocity, and moves the head at a constant velocity by feeding back a result of the comparison to determine the drive current.

The velocity control portion may control the voice coil motor to move the head from a start position to a stop position while writing the spiral reference servo signal. The start and stop positions may be restricted by crash stops which limit movement of an actuator arm of the hard disk drive.

The foregoing and/or other aspects of the present general inventive concept may also be achieved by providing a hard disk drive having a spiral reference servo signal that is referred to when writing a final servo signal while a head is moved for a predetermined time at a constant velocity in a radial direction of a disk. The hard disk drive includes a voice coil motor to move the head, a counter electromotive force measuring portion to measure a counter electromotive force of the voice coil motor, and a velocity control portion to control drive current that is applied to the voice coil motor. The velocity control portion controls the voice coil motor to accelerate the head from a start position to a reference servo writing start position to a target movement velocity by driving the voice coil motor, to move the head at the target movement velocity by feeding back an actual movement velocity of the head detected from the counter electromotive force of the voice coil motor for the predetermined time during which the spiral reference servo signal is written from the reference servo writing start position, and to move the head to a stop position after the predetermined time elapses.

The foregoing and/or other aspects of the present general inventive concept may also be achieved by providing a hard disk drive, including a disk having a spiral reference servo signal that is referred to when writing a final servo signal while a head is moved for a predetermined time at a constant velocity in a radial direction of the disk and having a track where a servo signal to indicate a reference writing start position is written, a voice coil motor to move the head in the radial direction of the disk, a counter electromotive force measuring portion to measure a counter electromotive force of the voice coil motor, and a velocity control portion to control drive current that is applied to the voice coil motor, and the velocity control portion controls the voice coil motor to allow the head to trace the track by moving the head from a start position, detect an actual movement velocity of the head from the counter electromotive force of the voice coil motor for the predetermined time during which the spiral reference servo signal is written from the track in the radial direction of the disk and move the head at a target movement velocity by feeding back the detected actual movement velocity, to move the head to a stop position by decelerating the head after the predetermined time elapses, and to return the head from the stop position to the start position.

The foregoing and/or other aspects of the present general inventive concept may also be achieved by providing a hard disk drive, including a magnetic head, a disk having a spiral reference servo signal that is referred to when writing a final servo signal while the magnetic head is moved for a predetermined time at a constant velocity in a radial direction of the disk and having a first track where a first servo signal to indicate a reference writing start position is written and a second track where a second servo signal to indicate a reference writing stop position is written, a voice coil motor to move the magnetic head in the radial direction of the disk, a counter electromotive force measuring portion to measure a counter electromotive force of the voice coil motor, and a velocity control portion to control drive current that is applied to the voice coil motor. The velocity control portion controls the voice coil motor to allow the head to trace the first track by moving the head from a start position, to detect an actual movement velocity of the magnetic head from the counter electromotive force of the voice coil motor for the predetermined time during which the spiral reference servo signal is written from the first track to the second track and move the head at a target movement velocity by feeding back the detected actual movement velocity, to move the magnetic head to a stop position by decelerating the magnetic head when the second track is detected, and to return the magnetic head from the stop position to the start position.

The foregoing and/or other aspects of the present general inventive concept may also be achieved by providing a servo signal writing apparatus usable with a hard disk drive having a disk, a magnetic head to write and read signals from the disk, and a voice coil motor to move the magnetic head with respect to the disk according to a drive current provided thereto, the apparatus including a counter electromotive force unit to measure counter electromotive force of the voice coil motor; and a velocity control unit to control the magnetic head to move between a write start position and a write stop position at a constant velocity based on the measured counter electromotive force such that the magnetic head writes one or more spiral reference servo signals between the write start and stop positions.

The foregoing and/or other aspects of the present general inventive concept may also be achieved by providing a servo signal writing apparatus usable with a hard disk drive having a disk, a magnetic head to write and read signals from the disk, and a voice coil motor to move the magnetic head with respect to the disk according to a drive current provided thereto, the apparatus including a velocity control unit to control the magnetic head to move in an acceleration phase in which the head is accelerated, a constant velocity phase in which the head is moved at a constant velocity, a deceleration phase in which the head is decelerated, and a feedback phase in which the head is moved back to a start position such that one or more spiral reference servo signals on the disk during the constant velocity phase.

The foregoing and/or other aspects of the present general inventive concept may also be achieved by providing a servo signal writing method of a hard disk drive, the method including accelerating a head from a first speed to a second speed between a start position and an outer diameter ring, maintaining the head at a target movement speed between the outer diameter ring and an inner diameter ring according to a signal corresponding to a movement of the head, and decelerating the head from a third speed to a fourth speed between the inner diameter ring and a stop position.

The foregoing and/or other aspects of the present general inventive concept may also be achieved by providing a servo signal writing apparatus usable in a hard disk drive having a voice coil motor to control a movement of a head with respect to a disk, the apparatus including a controller to control the voice coil motor to accelerate the head from a first speed to a second speed between a start position and an outer diameter ring of the disk, to maintain the head at a target movement speed between the outer diameter ring and an inner diameter ring of the disk according to a signal corresponding to a movement of the head, and to decelerate the head from a third speed to a fourth speed between the inner diameter ring and a stop position of the disk.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
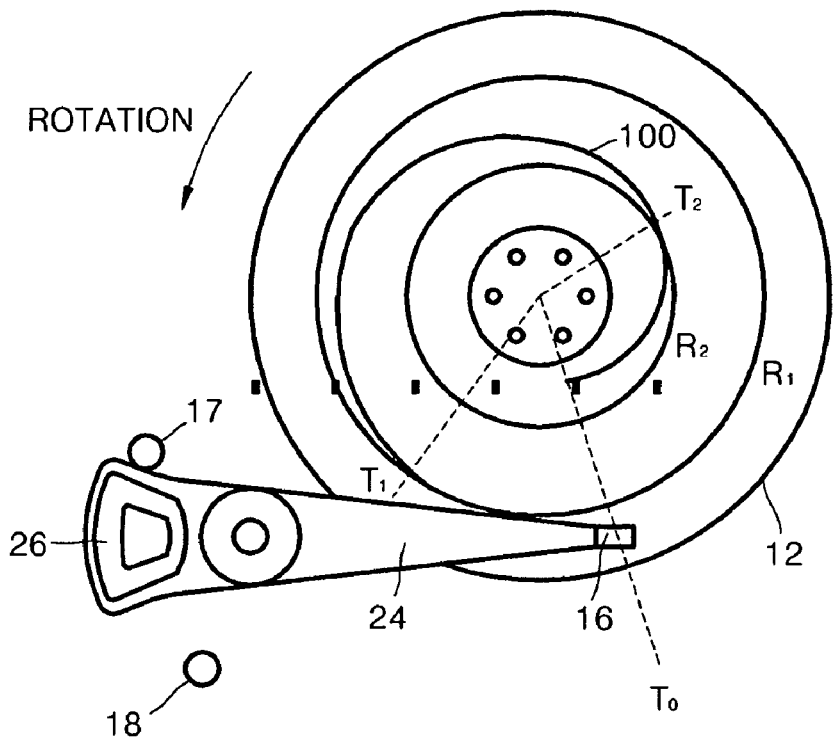
FIG. 1 is a view illustrating a conventional spiral reference servo signal writing method.
Figure 2:
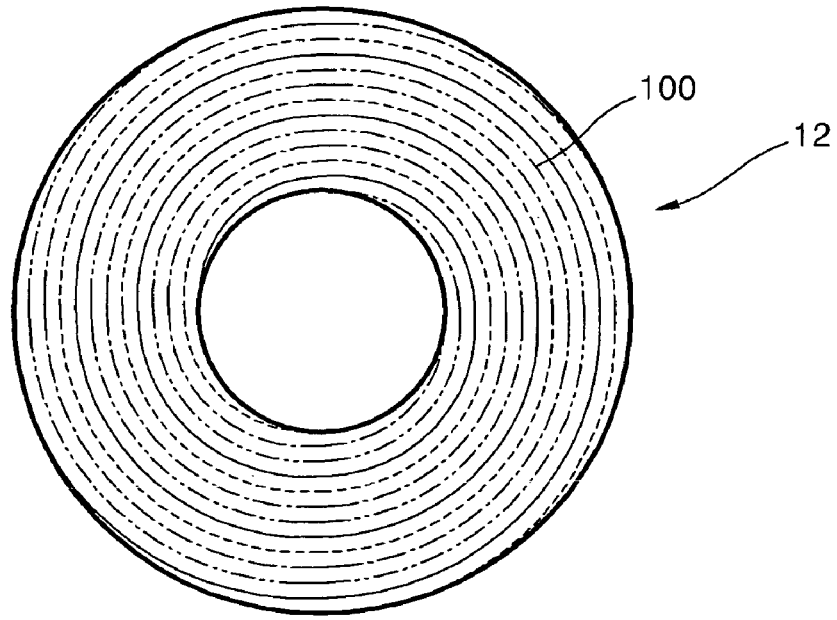
FIG. 2 is a view illustrating a conventional pattern of a spiral reference servo signal written to a disk.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
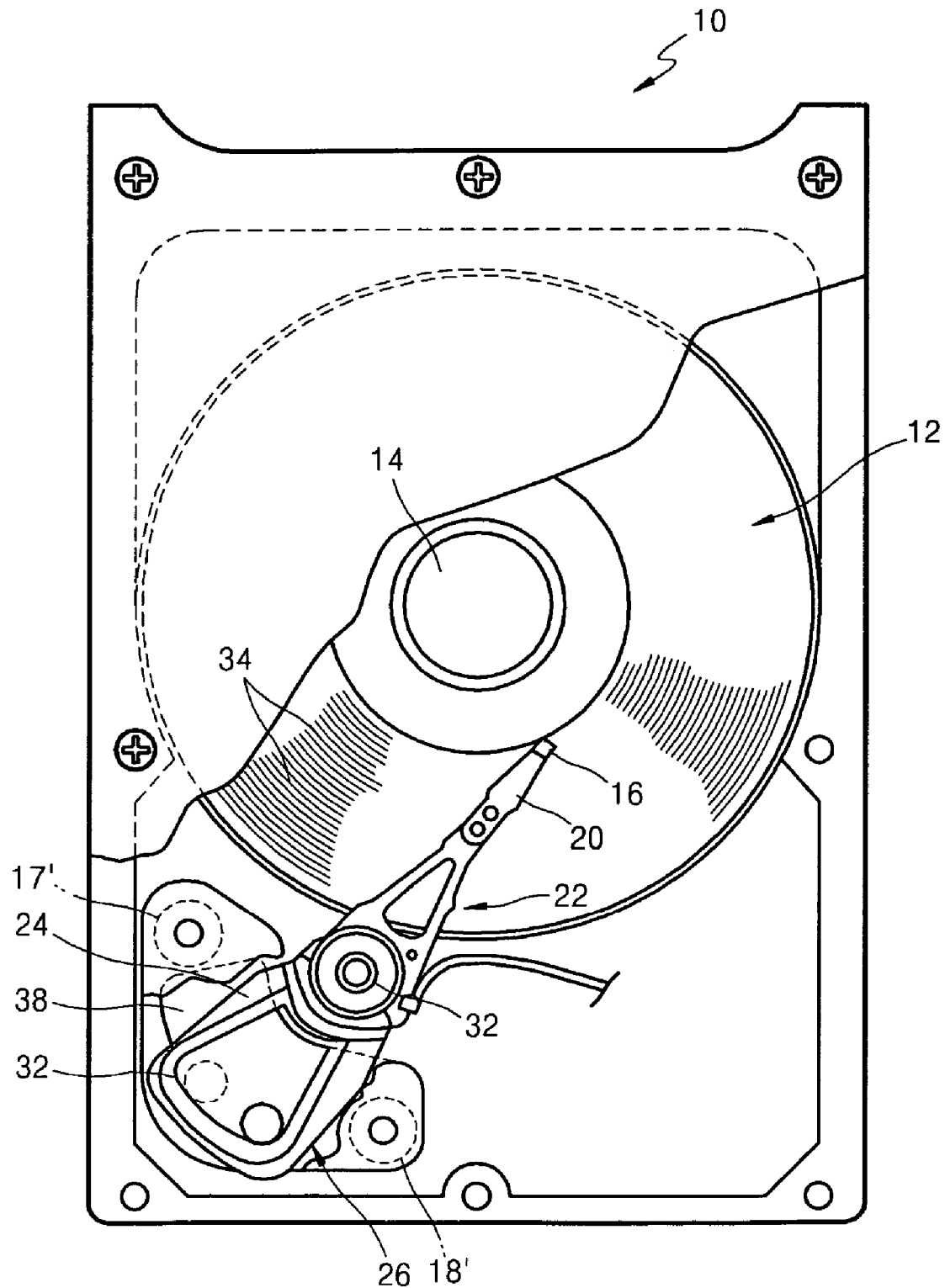
FIG. 4 is a view illustrating a hard disk drive according to an embodiment of the present general inventive concept.

FIG. 4 is a view illustrating a hard disk drive 10 according to an embodiment of the present general inventive concept. Referring to FIG. 4, the hard disk drive 10 includes at least one disk 12' that is rotated by a spindle motor 14. The hard disk drive 10 also includes a head 16' located adjacent to the surface of the disk 12'. The head 16' reads or records information with respect to the disk 12' that is rotating by detecting a magnetic field on the disk 12' or by magnetizing the disk 12'.

Typically, the head 16' is installed to face a surface of the disk 12'. Although the head 16' is illustrated as a single head in FIG. 4, the head 16' may include a recording head (not shown) to magnetize the disk 12' and a reading head (not shown), which is separate from the recording head, to detect the magnetic field of the disk 12'. The reading head includes a magneto-resistive (MR) device.

The head 16' can be incorporated into a slider 20. The slider 20 is configured to generated air bearing between the head 16' and a surface of the disk 12' and is coupled to a head gimbal assembly 22. The head gimbal assembly 22 is attached to an actuator arm 24' having a voice coil 26'. The voice coil 26' is located adjacent to a magnetic assembly 38 that specifies a voice coil motor (VCM) 30. Torque that rotates the actuator arm 24' with respect to a bearing assembly 32 is generated by current applied to the voice coil 26'. The rotation of the actuator arm 24' moves the head 16' across the surface of the disk 12'. Information is typically stored in circular tracks 34 of the disk 12'. Each of the tracks 34 generally includes a plurality of sectors and each sector includes a data field and an identification field. The identification field includes a gray code to identify the sector and the track (cylinder). The head 16' is moved across the surface of the disk 12' to read or write information to the disk 12'.

Figure 3:
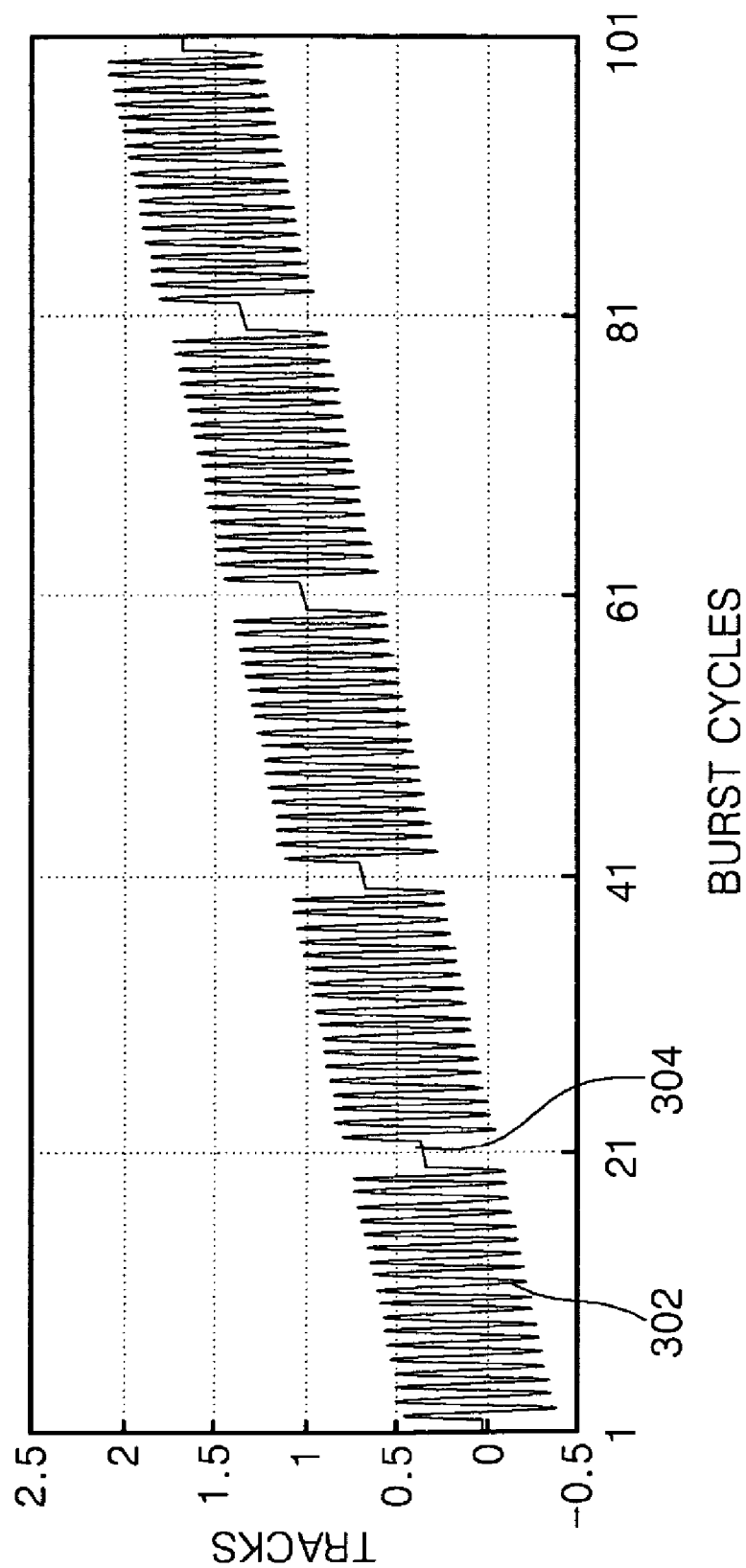
FIG. 3 is a view illustrating the conventional spiral reference servo signal of FIG. 2.
Figure 5:
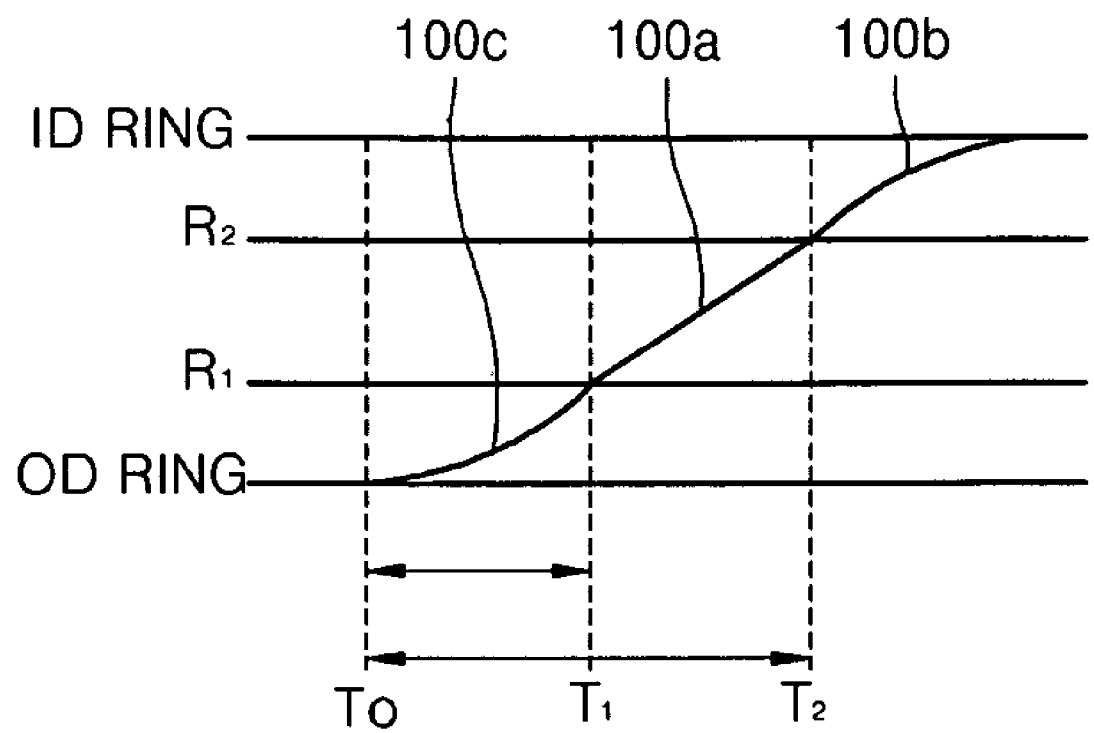
FIG. 5 is a view illustrating an operation of controlling a velocity of a head in writing a spiral reference servo signal, according to an embodiment of the present general inventive concept.

FIG. 5 is a view illustrating an operation of controlling a velocity of the head 16' when writing a spiral reference servo signal to the disc 12' in the hard disk drive 10 of FIG. 4. In order to maintain a constant interval between burst and sync bits of the spiral reference servo signal, the head 16' should move at a constant velocity (i.e., a target movement velocity indicated by a linear line 100a having a particular inclination in FIG. 5), between a reference writing start position $R_1$ and a reference writing stop position $R_2$. The burst and sync bits of the spiral reference servo signal may be similar to burst and sync bits 302 and 304 of FIG. 3. The constant velocity indicates that the head 16' indicates that the head 16' moves at the constant speed with respect to the disk 12' such that the head 16' crosses the tracks at the constant velocity in the radial direction of the disk 12'.

The head 16' starts to accelerate from a start position (i.e., outer diameter ring or OD Ring) as illustrated by a curved line 100c FIG. 5 at a time point $T_0$ and has a particular velocity at a time point $T_1$ when the head 16' arrives at the reference writing start position $R_1$. The particular velocity is maintained until the head 16' reaches the reference writing stop position $R_2$. The head 16' is decelerated at the time point $T_2$ as illustrated by a curved line 100b when the head 16' arrives at the reference writing stop position $R_2$ and is stopped at a stop position ID Ring. The start position OD Ring and the stop position (i.e., inner diameter ring or ID Ring) correspond to positions that are restricted by crash stops 17' and 18' illustrated in FIG. 4. In other words, the head 16' is in a position that corresponds to the OD Ring when the actuator 24' is stopped by the crash stop 17', and the head 16' is in a position that corresponds to the ID Ring when the actuator 24' is stopped by the crash stop 18'. The head 16' moves at a different speed to cross tracks of the disk 12' as illustrated by the curved lines 100b and 100c in FIG. 5.

Figure 6:
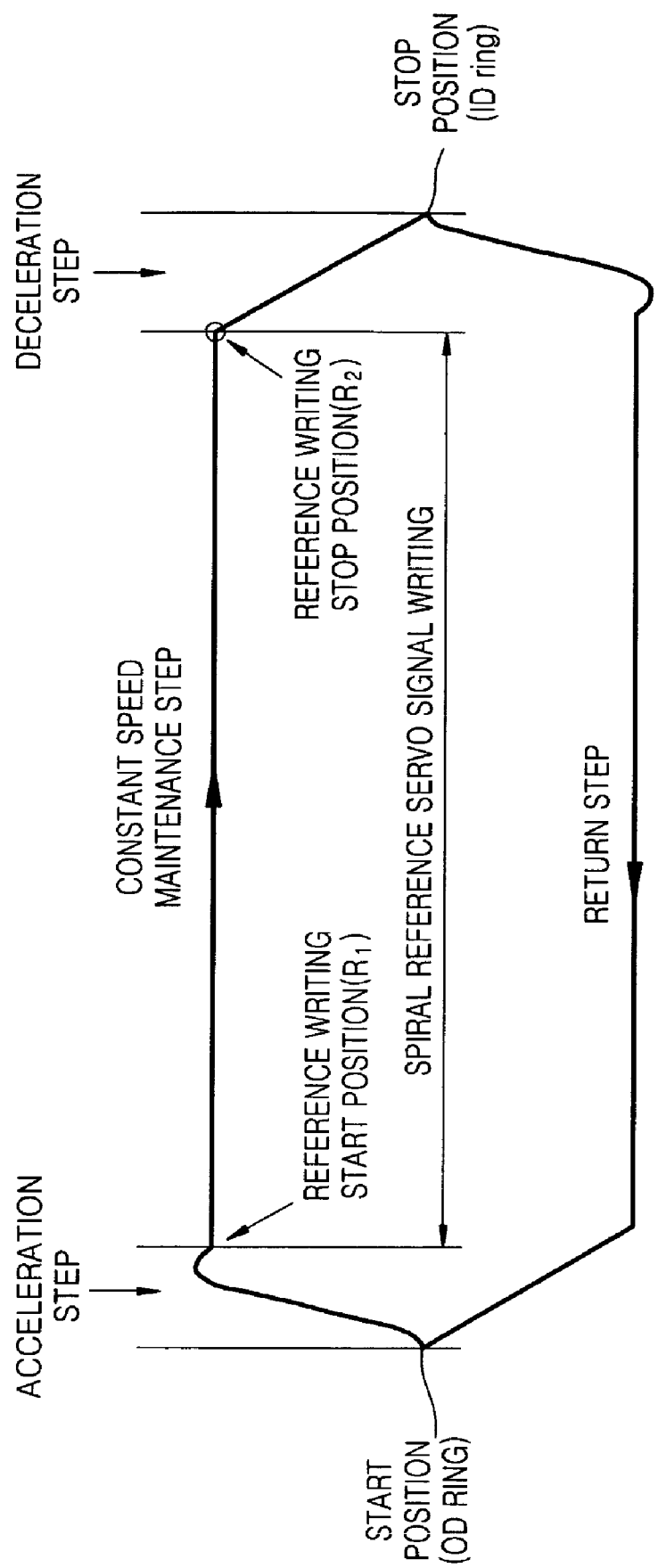
FIG. 6 is a view illustrating a velocity profile to write the spiral reference servo signal.

FIG. 6 schematically illustrates a velocity profile to write the spiral reference servo signal the disk 12'. The velocity profile represents that a speed of the head 16' with respect to the disk 12' in a direction to a rotation center of the disk 12' varies according to the ID and OD rings. The velocity profile includes a series of operations including, for example, acceleration, maintaining constant velocity, deceleration, and feedback. The head 16' is driven from the start position OR Ring of FIG. 6, in the acceleration operation (1) and is accelerated to have the particular velocity at the reference writing start position $R_1$, maintains the particular velocity from the reference writing start position $R_1$ to the reference writing stop position $R_2$ in the constant velocity maintenance operation (2), is decelerated until the head 16' reaches the stop position ID Ring of FIG. 6 in the deceleration operation (3), and is returned to the original start position OD Ring in the feedback operation (4). The acceleration, constant velocity, deceleration, and feedback operations may be performed by the actuator 24', the voice coil motor 30, and/or other components of the hard disk drive 10.

Figure 7:
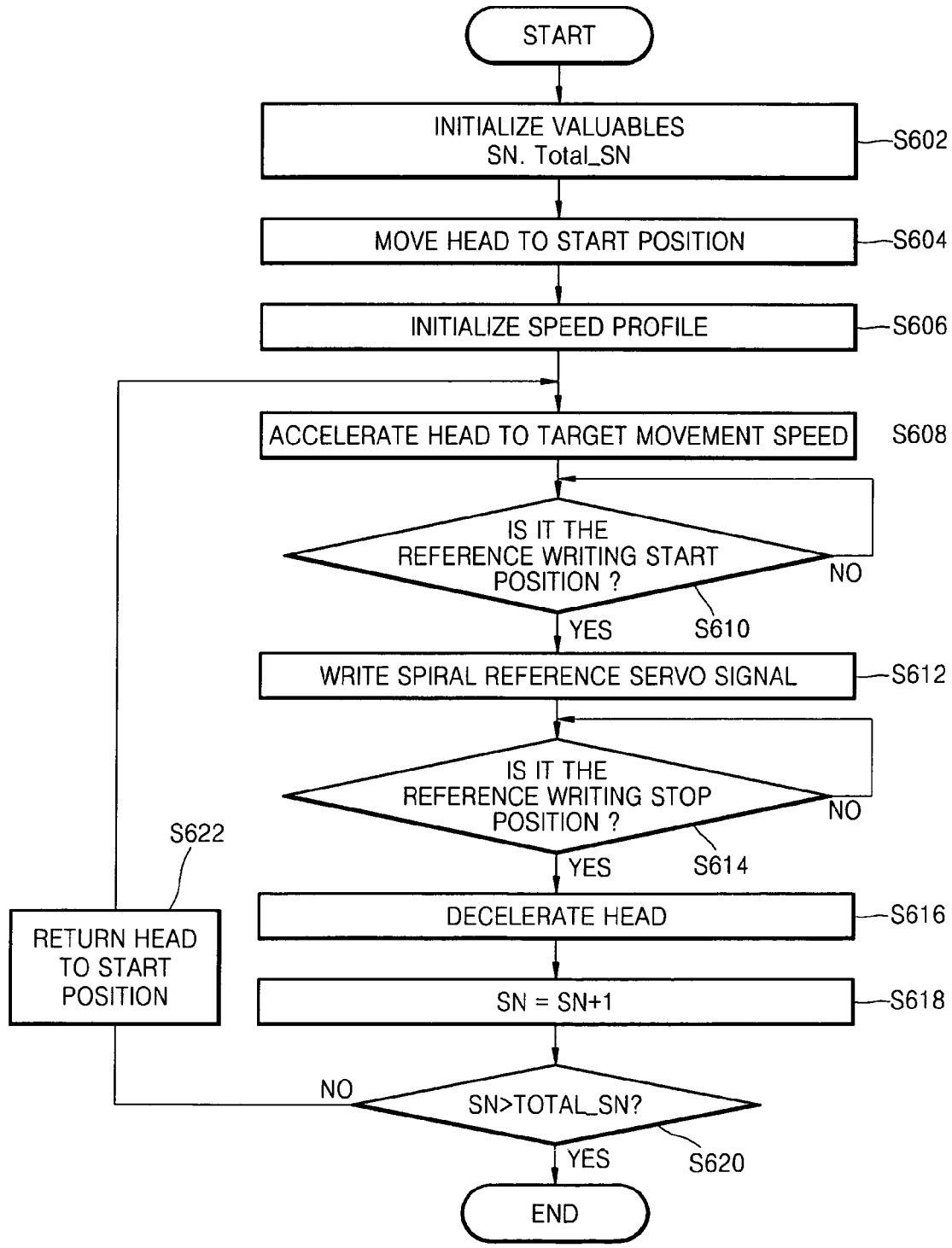
FIG. 7 is a flow chart illustrating a method of writing a spiral reference servo signal according to an embodiment of the present general inventive concept.

FIG. 7 is a flow chart illustrating a method of writing the spiral reference servo signal according to an embodiment of the present general inventive concept. First, variables used to control the velocity profile of the head 16' are initialized (operation S602). SN represents a presently written spiral track number and Total_SN represents a total number of the written spiral tracks. The Total_SN is typically equal to or twice a number of sectors per track. In the operation S602, SN may be set to 0.

The head 16' is located at the start position OR Ring of FIG. 5 (operation S604). The velocity profile to write the spiral reference servo signal is initialized (operation S606). Since the spiral reference servo signal is typically written in a clean room in which a constant temperature is maintained, the velocity profile is set according to a temperature of the clean room.

A drive current corresponding to the target movement velocity of the head 16' is applied to the voice coil motor 30 to accelerate the head 16' to the target movement velocity (operation S608). It is determined whether the head 16' is in the reference writing start position R1 (operation S610). Since a predetermined number of the spiral reference servo signals need to be written from the reference writing start position $R_1$ to the reference writing stop position $R_2$ in the radial direction of the disk 12' and at a constant interval in a circumferential direction of the disk 12', the reference writing start position $R_1$ is defined by coordinates in the disk radial direction and the disk circumferential direction.

The coordinate in the disk radial direction is determined by referring to a counter electromotive force of the VCM 30, while the coordinate in the disk circumferential direction is determined by referring to an index signal of the spindle motor 14 to rotate the disk 12'. The counter electromotive force (counter EMF) refers a voltage induced into an inductor due to an alternating or pulsating current, and is in a polarity opposite to that of a voltage applied the voice coil 26 of the VCM 30. The counter electromotive force opposes a change in current of the voice coil 26. The movement velocity of the head 16' is detected from the counter electromotive force of the VCM 30, and a movement distance of the head 16' can be calculated by integrating the detected movement velocity with respect to a movement time of the head 16'. Since the head 16' is accelerated from a particular position, for example, the start position OD Ring of FIG. 6, the coordinate in the radial direction of the reference writing start position $R_1$ can be defined by referring to the movement time $T_0$-$T_1$ of the head 16' from the start position OD Ring.

The spindle motor 14 generates the index signal. The index signal is generated to be synchronized with the rotation of the spindle motor 14. When the rotation of the spindle motor 14 is maintained constant, a time interval between the index signals is also constant. Thus, by detecting the time that passes after the index signal is generated, the coordinate of the reference writing start position $R_1$ on the circumference of the disk 12' (i.e., in the disk circumferential direction) can be specified.

When the reference writing start position $R_1$ is detected, the spiral reference servo signal is written while maintaining the movement velocity of the head 16' at a constant velocity (operation S612). The movement velocity of the head 16' is detected from the counter electromotive force of the VCM 30. The movement velocity of the head 16' is controlled by feeding back the difference between the movement velocity (i.e., a current movement velocity) and the target movement velocity of the head 16'.

Whether the head 16' is at the reference writing stop position $R_2$ is determined (operation S614). The reference writing stop position $R_2$ is detected by referring to the head movement velocity (which is constant when the head 16' is between the reference writing start position $R_1$ and the reference writing stop position $R_2$) and the elapsed time $T_1$-$T_2$. Since the head 16' is specified by the distance that the head 16' moves in the disk radial direction, the reference writing stop position $R_2$ is detected by referring to the head movement velocity and the elapsed time $T_1$-$T_2$. When the reference writing stop position $R_2$ is detected, the head 16' is decelerated to a predetermined velocity and is moved to the stop position ID Ring (operation S616).

SN is then increased by 1 (operation S618). Whether SN is greater than Total_SN is then determined (operation S620). That is, whether all spiral reference servo signals are written is determined in the operation S620. If all spiral reference servo signals are written (i.e., SN is greater than Total_SN), the spiral reference servo signal writing operation is terminated.

When the spiral reference servo signals are determined not to have all been written at the operation S620 (i.e., SN is not greater than Total_SN), the head 16' is returned to the start position OR Ring of FIG. 6, (operation S622) and the method returns to the operation S608. When the head 16' is returned to the start position OR Ring of FIG. 6, the head movement velocity is controlled using the counter electromotive force of the VCM 30.

In the embodiment of FIG. 7, in order to specify the reference writing start position $R_1$, the start position OD Ring, the elapsed time $T_0$-$T_1$, and the head movement velocity, the counter electromotive force of the VCM 30 is used. However, the reference writing start position $R_1$ can be specified using different methods. For example, a disk where a servo signal is written in advance in a portion corresponding to the reference writing start position $R_1$ and the reference writing stop position $R_2$ can be used. The servo signal is similar to the final servo signal. Also, in order to increase resolution, a track width of the servo signal may be narrower than that of the final servo signal and the number of sectors per track of the servo signal may be larger than that of the final servo signal.

Referring to FIGS. 4 to 7, when power is applied to the hard disk drive 10, the hard disk drive 10 searches the servo signal corresponding to the reference writing start position $R_1$. When the track where the servo signal is written is traced and a servo index signal that is a reference time point of the servo signal is searched, the head 16' is moved at the target movement velocity and a first spiral reference servo signal is written. The servo index signal, which provides the reference time point, corresponds to the index signal generated by the spindle motor 14.

The spiral reference servo signal is written until the head 16' meets the servo signal written at a position corresponding to the reference writing stop position $R_2$. When the first spiral reference servo signal is written, a second spiral reference servo signal is written from a time point after a predetermined time elapses from when the index signal is generated by the spindle motor 14. The above process and operations are repeated until all spiral reference servo signals are written.

Figure 8:
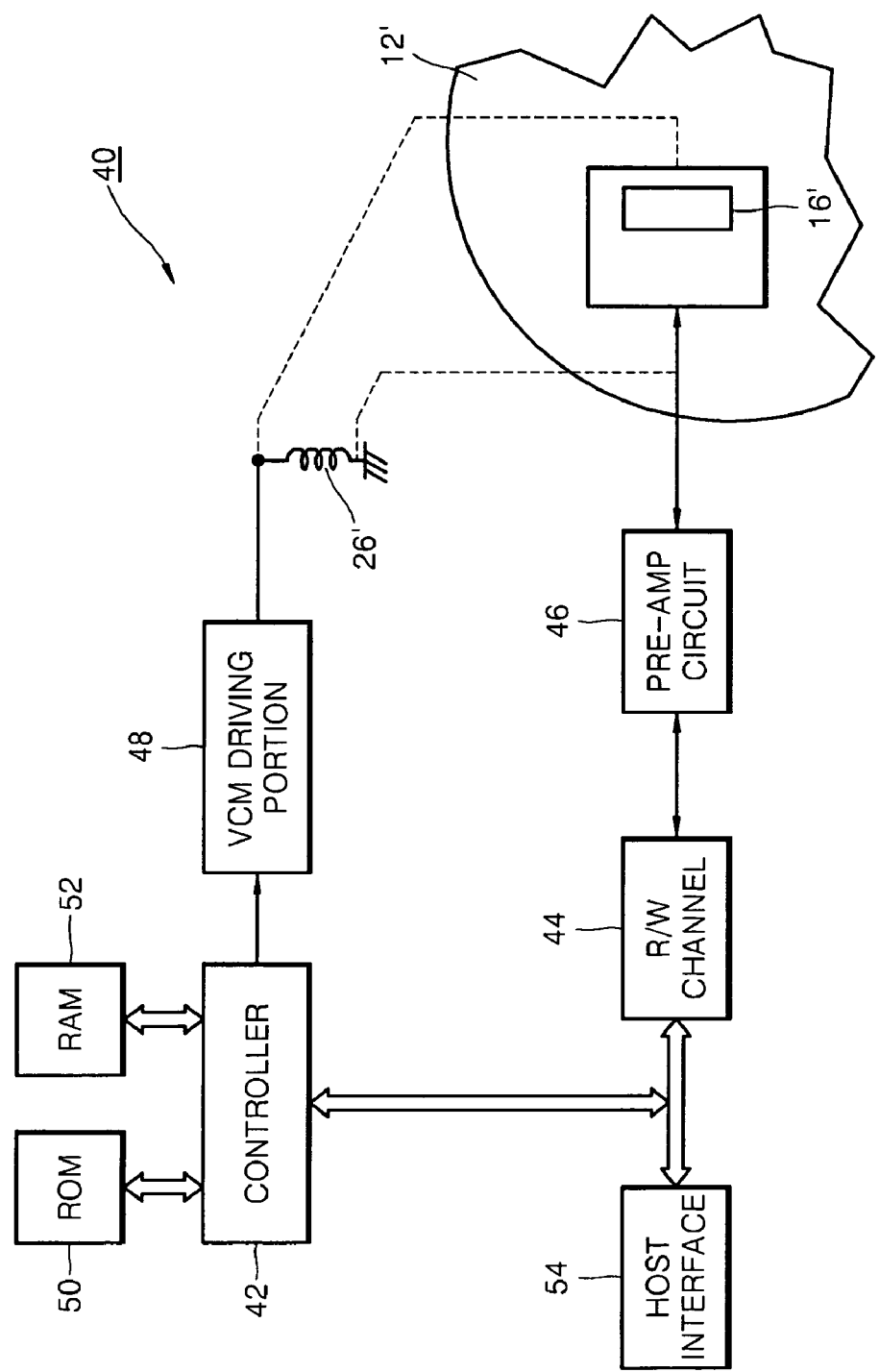
FIG. 8 is a block diagram illustrating a system to control the hard disk drive of FIG. 4.

FIG. 8 is a block diagram illustrating a system 40 to control the hard disk drive 10 of FIG. 4. The system 40 includes a read/write (R/W) channel 44 and a controller 42 connected to the head 16' via a pre-amp circuit 46. The controller 42 may be a digital signal processor (DSP), a microprocessor, or a microcontroller. The controller 42 provides the R/W channel 44 with a control signal to read or record information with respect to the disk 12'. Information is typically transmitted from the R/W channel 44 to a host interface circuit 54. The host interface circuit 54 includes a buffer memory (not shown) and a control circuit (not shown) to interface with another system, such as a personal computer.

The controller 42 is coupled to a VCM driving portion 48 to supply drive current to the voice coil 26. The controller 42 also provides a control signal to the VCM driving portion 48 to control the excitation of the VCM 26 and the movement of the head 16'. The controller 42 is coupled to a non-volatile memory, such as a read only memory (ROM) 50 or a flash memory device, and a random access memory (RAM) 52. The memory devices 50 and 52 include commands and data used by the controller 42. A software routine includes a search control routine to move the head 16' from one track to another track. Also, there is a control routine to record the spiral reference servo signal according to embodiments of the present general inventive concept.

When the power is applied to the hard disk drive 10, the controller 42 determines whether the recording of a reference servo signal is needed. First, when the final servo signal and the reference servo signal are not recorded on the disk 12', the controller 42 records the spiral reference servo signal on the disk 12' according to the method illustrated in FIG. 7.

A program to record the spiral reference servo signal (i.e., computer readable medium having execution codes and data) is stored in the ROM 50 while control variables (e.g., SN and Total_SN) and data to execute the program are preserved in the RAM 52. The controller 42, as described below with reference to FIG. 9, measures the counter electromotive force generated by the voice coil motor 30 through a counter electromotive force measuring apparatus (not shown) and controls the movement velocity of the head 16' using the measured counter electromotive force.

The R/W channel 44 writes spiral reference servo data. The spiral reference servo data is to record the burst 302 and the servo bit 304 of FIG. 3. The spiral reference servo data is buffered in a buffer memory (not shown) of the R/W channel 44. The spiral reference servo data stored in the buffer memory is read from the reference writing start position $R_1$ and provided to the pre-amp 46.

The controller 42 waits for the start of the reference writing start position $R_1$ and then reads the spiral reference servo data stored in the memory of the R/W channel 44 and starts writing to the disk 12'. When the reference writing stop position $R_2$ is reached, the writing of the spiral reference servo signal is interrupted and the head 16' is moved to a next reference writing start position $R_1$ to resume the writing.

The controller 42 detects the reference writing start position $R_1$ and the reference writing stop position $R_2$ by referring to the counter electromotive force of the voice coil motor 30 and the elapsed time (which corresponds to the index signal generated by the spindle motor 14). When the disk 12' having a track on which an additional servo signal is written at the reference writing start position $R_1$ and the reference writing stop position $R_2$ is used, the controller 42 traces the track where the servo signal is recorded which corresponds to the reference writing start position $R_1$. When the head 16' meets a servo index signal that is the reference point of the servo signal, the head 16' is moved at the target movement velocity and writes the first spiral reference servo signal.

The spiral reference servo signal is written until the head 16' meets the servo signal written at a position corresponding to the reference writing stop position $R_2$. When the first spiral reference servo signal is written, the controller 42 again traces a track corresponding to the reference writing start position $R_1$ and the second spiral reference servo signal is written after the predetermined time passes from the servo index signal. The above process and operations are repeated until all spiral reference servo signals are written.

Figure 9:
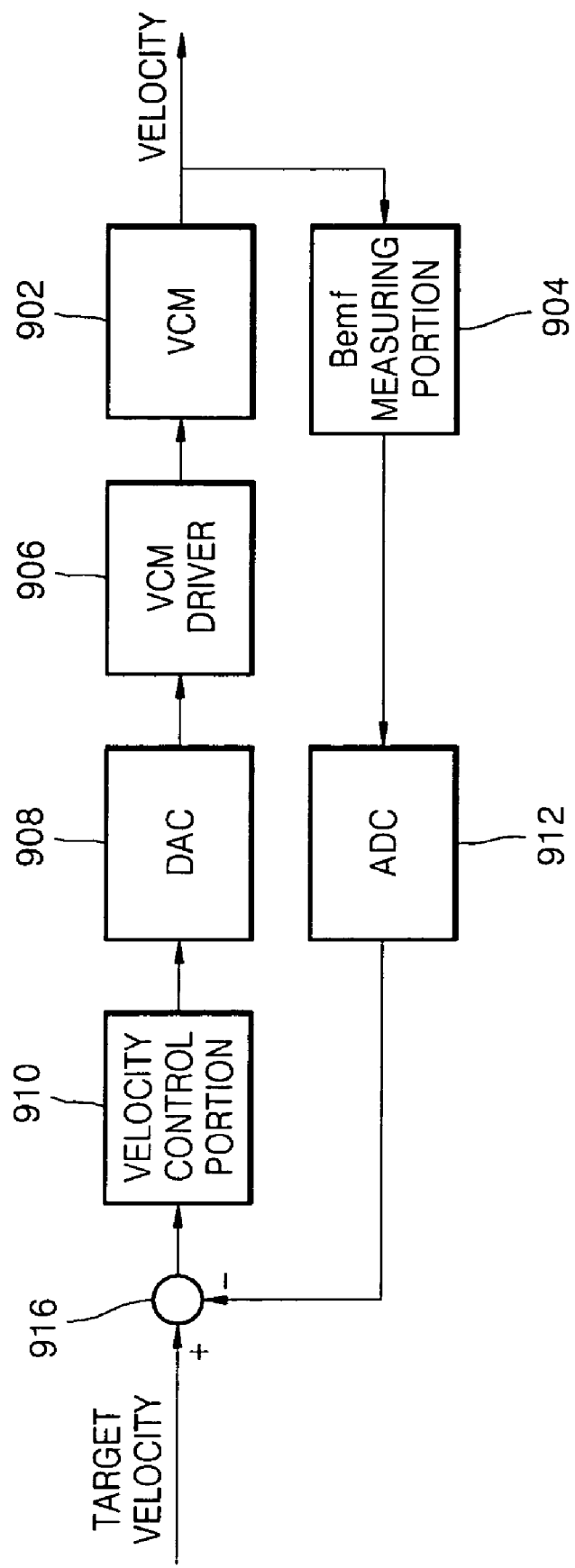
FIG. 9 is a block diagram illustrating an apparatus to control the velocity of a head using a counter electromotive force, according to an embodiment of the present general inventive concept.

FIG. 9 is a block diagram illustrating an apparatus to control the velocity of the head 16' using the counter electromotive force. Referring to FIG. 9, the apparatus includes a VCM 902, a VCM driver 906, a counter electromotive force measuring portion 904 to measure the counter electromotive force Bemf generated by the VCM 902, an analog/digital converter (ADC) 912 to convert a result of the measurement of the counter electromotive force measuring portion 904 from an analog signal (value) to a digital signal (value), and a velocity control portion 910 to control the velocity of the head 16'.

The velocity control portion 910 applies drive current (i.e., acceleration current and deceleration current) to the VCM driver 906 to control the velocity of the head 16' and compares the movement velocity of the head 16' corresponding to the counter electromotive force Bemf of the VCM 902 provided by the ADC 912 with the target movement velocity so that the velocity of the head 16' is controlled by feedback control. The movement velocity of the head 16' corresponding to the counter electromotive force Bemf of the VCM 902 provided by the ADC 912 with the target movement velocity are compared by a comparator 916 and a difference value is input to the velocity control portion 910.

A digital/analog converter (DAC) 908 converts a digital value output from the velocity control portion 910 to an analog value and provides the analog value to the VCM driver 906. The velocity control portion 910 of FIG. 9 may be embodied by a microprocessor operated according to a program, for example, the controller 42 of FIG. 8.

The present general inventive concept can be implemented as a method, apparatus, or system. When the present general inventive concept is implemented as software, elements of the present general inventive concept are code segments that execute operations. The program or code segments can be stored in a processor readable medium or transmitted by a computer data signal combined with a carrier wave in a transmission medium or communication network. The processor readable medium includes any media capable of storing or transmitting information. For example, the processor readable medium includes an electronic circuit, a semiconductor memory device, a ROM flash memory, an Erasable ROM (EROM), a floppy disk, an optical disk, a hard disk, an optical fiber medium, and a radio frequency (RF) network. The computer data signal includes any signals which can be transmitted through a transmission medium such as an electronic network channel, optical fiber, air, an electronic field, and an RF network.

As described above, in a method of writing a spiral reference servo signal according to embodiments of the present general inventive concept, since a hard disk drive can write the spiral reference servo signal without a servo writer, a manufacturing cost of the hard disk drive is reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of writing a reference servo signal of a hard disk drive, the method comprising:
    writing a spiral reference servo signal that is referred to when writing a final servo signal is written, while a head is moved across a disk for a predetermined time at a target movement velocity;
    detecting an actual movement velocity of the head from a counter electromotive force generated in a voice coil motor that moves the head for the predetermined time during which the spiral reference servo signal is written; and
    controlling the head to maintain the target movement velocity by feeding back the detected actual movement velocity.

2. A method of writing a reference servo signal in which a spiral reference servo signal that is referred to when writing a final servo signal of a hard disk drive is written, the method comprising:
    accelerating a head to a target movement velocity from a start position to a reference servo writing start position by driving a voice coil motor;
    detecting an actual movement velocity of the head using a counter electromotive force of the voice coil motor for a predetermined time during which the spiral reference servo signal is written from the reference servo writing start position and moving the head at the target movement velocity by feeding back the detected actual movement velocity; and
    decelerating and moving the head to a stop position after the predetermined time elapses.

3. The method as claimed in claim 2, further comprising:
    returning the head from the stop position to the start position.

4. The method as claimed in claim 3, wherein the start position and the stop position are restricted by crash stops which limit movement of an actuator arm mounted with the head of the hard disk drive.

5. The method as claimed in claim 2, wherein a distance from the start position to the reference writing start position in a radial direction of the disk is constant.

6. The method as claimed in claim 5, wherein the distance from the start position to the reference writing start position is detected by integrating the actual movement velocity of the head detected from the counter electromotive force of the voice coil motor and elapsed time from the start position.

7. The method as claimed in claim 2, wherein the reference writing start position on a circumference of the disk is determined with respect to an index signal of a spindle motor that rotates the disk.

8. A method of writing a reference servo signal on a disk to write a final servo signal of a hard disk drive using the disk having a track where the servo signal to indicate a reference writing start position is written, the method comprising:
    tracing the track by moving a head from a start position;
    detecting an actual movement velocity of the head from a counter electromotive force of a voice coil motor for a predetermined time during which a spiral reference servo signal is written in a radial direction of the disk from the track, and moving the head at a target movement velocity by feeding back the detected actual movement velocity;
    decelerating and moving the head to a stop position after the predetermined time elapses; and
    returning the head from the stop position to the start position.

9. The method as claimed in claim 8, wherein the start position and the stop position are restricted by crash stops which limit movement of an actuator arm of the hard disk drive.

10. The method as claimed in claim 8, wherein the distance from the start position to the reference writing start position is detected by integrating the movement velocity of the head detected from the counter electromotive force of the voice coil motor and the elapsed time from the start position.

11. The method as claimed in claim 8, wherein the reference writing start position on a circumference of the disk is determined with respect to an index signal of a spindle motor that rotates the disk.

12. A method of writing a reference servo signal to write a final servo signal of a hard disk drive using a disk having a first track where a first servo signal to indicate a reference writing start position is written and a second track where a second servo signal to indicate a reference writing stop position is written, the method comprising:
    tracing the first track by moving a head from a start position;
    detecting an actual movement velocity of the head from a counter electromotive force of a voice coil motor for a time period during which a spiral reference servo signal is written from the first track to the second track, and moving the head at a target movement velocity by feeding back the detected actual movement velocity;
    decelerating and moving the head to a stop position when the second track is detected; and
    returning the head from the stop position to the start position.

13. The method as claimed in claim 12, wherein the start position and the stop position are restricted by crash stops which limit movement of an actuator arm of the hard disk drive.

14. A hard disk drive having a spiral reference servo signal written thereon that is referred to when writing a final servo signal while a head is moved for a predetermined time at a constant velocity in a radial direction of a disk, the hard disk drive comprising:
    a voice coil motor to move the head;
    a counter electromotive force measuring portion to measure a counter electromotive force of the voice coil motor; and
    a velocity control portion to control drive current that is applied to the voice coil motor, to detect an actual movement velocity of the head from the counter electromotive force measured by the counter electromotive measuring portion for the predetermined time during which the spiral reference servo signal is written, to compare the detected actual movement velocity with a target movement velocity, and to move the head at a constant velocity by feeding back a result of the comparison to determine the drive current.

15. The hard disk drive as claimed in claim 14, wherein the velocity control portion controls the voice coil motor to move the head from a start position to a stop position while writing the spiral reference servo signal, and the start position and the stop position are restricted by crash stops which limit movement of an actuator arm of the hard disk drive.

16. A hard disk drive having a spiral reference servo signal that is referred to when writing a final servo signal while a head is moved for a predetermined time at a constant velocity in a radial direction of a disk, the hard disk drive comprising:
- a voice coil motor to move the head;
- a counter electromotive force measuring portion to measure a counter electromotive force of the voice coil motor; and
- a velocity control portion to control drive current that is applied to the voice coil motor, to control the voice coil motor to accelerate the head from a start position to a reference servo writing start position to a target movement velocity by driving the voice coil motor, to move the head at the target movement velocity by feeding back an actual movement velocity of the head detected from the counter electromotive force of the voice coil motor for the predetermined time during which the spiral reference servo signal is written from the reference servo writing start position, and to move the head to a stop position after the predetermined time elapses.

17. The hard disk drive as claimed in claim 16, wherein the start position and the stop position are restricted by crash stops which limit movement of an actuator arm of the hard disk drive.

18. A hard disk drive in which a spiral reference servo signal that is referred to for writing a final servo signal is written while a head is moved for a predetermined time at a constant velocity in a radial direction of a disk, the hard disk drive comprising:
- a disk having a track where a servo signal to indicate a reference writing start position is written;
- a voice coil motor to move the head in a radial direction of the disk;
- a counter electromotive force measuring portion to measure a counter electromotive force of the voice coil motor; and
- a velocity control portion to control drive current that is applied to the voice coil motor, to control the voice coil motor to allow the head to trace the track by moving the head from a start position, to detect an actual movement velocity of the head from the counter electromotive force of the voice coil motor for the predetermined time during which the spiral reference servo signal is written from the track in the radial direction of the disk, to move the head at a target movement velocity by feeding back the detected actual movement velocity, to move the head to a stop position by decelerating the head after the predetermined time elapses, and to return the head from the stop position to the start position.

19. The hard disk drive as claimed in claim 18, wherein the start position and the stop position are restricted by crash stops which limit movement of an actuator arm of the hard disk drive.

20. A hard disk drive in which a spiral reference servo signal that is referred to for writing a final servo signal is written while a head is moved for a predetermined time at a constant velocity in a radial direction of a disk, the hard disk drive comprising:
- a disk having a first track where a first servo signal to indicate a reference writing start position is written and a second track where a second servo signal to indicate a reference writing stop position is written;
- a voice coil motor to move the head in a radial direction of the disk;
- a counter electromotive force measuring portion to measure a counter electromotive force of the voice coil motor; and
- a velocity control portion to control drive current that is applied to the voice coil motor, to control the voice coil motor to allow the head to trace the first track by moving the head from a start position, to detect an actual movement velocity of the head from the counter electromotive force of the voice coil motor for the predetermined time during which the spiral reference servo signal is written from the first track to the second track, to move the head at a target movement velocity by feeding back the detected actual movement velocity, to move the head to a stop position by decelerating the head when the second track is detected, and to return the head from the stop position to the start position.

21. The hard disk drive as claimed in claim 20, wherein the start position and the stop position are restricted by crash stops which limit movement of an actuator arm of the hard disk drive.

* * * * *